(12) United States Patent
Ghia (10) Patent No.: US 11,158,172 B2
(45) Date of Patent: *Oct. 26, 2021

(54) METHOD AND SYSTEM FOR ENHANCED LOTTERY TICKET ACTIVATION AND SALE AT A RETAIL ESTABLISHMENT WITH SUBSEQUENT BILLING AND ACCOUNTABILITY OF SOLD TICKETS

(71) Applicant: Scientific Games International, Inc., Newark, DE (US)

(72) Inventor: Ajay J. Ghia, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,537

(22) Filed: Aug. 5, 2019

(65) Prior Publication Data

US 2019/0355205 A1 Nov. 21, 2019

Related U.S. Application Data

(63) Continuation of application No. 15/188,469, filed on Jun. 21, 2016, now Pat. No. 10,373,443.

(51) Int. Cl.
*G07F 17/32* (2006.01)
*G06Q 20/20* (2012.01)
*G06Q 50/34* (2012.01)

(52) U.S. Cl.
CPC ......... *G07F 17/329* (2013.01); *G06Q 20/202* (2013.01); *G06Q 50/34* (2013.01); *G07F 17/3241* (2013.01)

(58) Field of Classification Search
None
See application file for complete search history.

(56) References Cited

U.S. PATENT DOCUMENTS

| | | | |
|---|---|---|---|
| 1,905,659 A | 4/1933 | Thomson | |
| 2,219,650 A | 10/1940 | Helsel | |

(Continued)

FOREIGN PATENT DOCUMENTS

| | | |
|---|---|---|
| CA | 2 566 152 A1 | 5/2003 |
| CA | 2 724 047 A1 | 3/2011 |

(Continued)

OTHER PUBLICATIONS

U.S. Appl. No. 14/802,526, filed Jul. 17, 2015.
EPO Search Report, dated Oct. 25, 2017.

*Primary Examiner* — Jason T Yen
(74) *Attorney, Agent, or Firm* — Dority & Manning, P.A.

(57) ABSTRACT

A system and associated method are provided for activating and dispensing lottery tickets at a retail establishment. For each pack of lottery tickets delivered to the retail establishment, a pack code unique to the pack is scanned and transmitted to a central lottery server. At the central lottery server, the lottery tickets within the ticket packs associated with the pack codes are electronically activated to a ready for sale status in a database. At the retail establishment, a unique ticket code provided on each lottery ticket is scanned at a time of sale of the individual lottery ticket and transmitted to the central lottery server wherein it is confirmed that the ticket code is associated with a lottery ticket previously flagged as ready for sale and, if so, the individual ticket is flagged as sold in the same or a different database. At defined time intervals, accountability and billing information is provided from the central lottery server to a central retail establishment server based on individual lottery tickets flagged as activated and sold during the defined time periods.

6 Claims, 5 Drawing Sheets

(56) References Cited

U.S. PATENT DOCUMENTS

| | | |
|---|---|---|
| 2,252,720 A | 10/1941 | Metzner |
| 2,325,054 A | 7/1943 | Helsel |
| 2,776,007 A | 1/1957 | Dietz et al. |
| 2,970,784 A | 2/1961 | Kessler |
| 3,481,520 A | 12/1969 | Pickering |
| 3,794,228 A | 2/1974 | Colwell et al. |
| 3,894,669 A | 7/1975 | Wescoat |
| 4,094,451 A | 6/1978 | Wescoat |
| 4,202,468 A | 5/1980 | Anderson |
| 4,284,221 A | 8/1981 | Nagel et al. |
| 4,397,410 A | 8/1983 | Schueler |
| 4,515,321 A | 5/1985 | Kahlman |
| 4,586,639 A | 5/1986 | Ruff et al. |
| 4,688,708 A | 8/1987 | Irvine et al. |
| 4,697,726 A | 10/1987 | Gaucher |
| 4,716,799 A | 1/1988 | Hartmann |
| 4,730,762 A | 3/1988 | Felix |
| 4,844,369 A | 7/1989 | Kanayachi |
| 5,074,566 A | 12/1991 | Desbiens |
| 5,113,758 A | 5/1992 | Chou |
| 5,133,615 A | 7/1992 | Saito et al. |
| 5,158,293 A | 10/1992 | Mullins |
| 5,160,076 A | 11/1992 | Ford |
| 5,215,383 A | 6/1993 | Hilton |
| 5,216,595 A | 6/1993 | Protheroe |
| 5,239,165 A | 8/1993 | Novak |
| 5,256,863 A | 10/1993 | Ferguson et al. |
| 5,408,417 A | 4/1995 | Wilder |
| 5,503,318 A | 4/1996 | Chou |
| 5,569,082 A | 10/1996 | Kaye |
| 5,709,603 A | 1/1998 | Kaye |
| 5,833,104 A | 11/1998 | Horniak et al. |
| 5,836,498 A | 11/1998 | Turek |
| 5,882,260 A | 3/1999 | Marks et al. |
| 5,927,583 A | 7/1999 | Kyle |
| 6,029,851 A | 2/2000 | Jenkins |
| 6,056,289 A | 5/2000 | Clapper, Jr. |
| 6,168,521 B1 | 1/2001 | Luciano et al. |
| 6,267,670 B1 | 7/2001 | Walker et al. |
| 6,351,688 B1 | 2/2002 | Nichols |
| 6,405,924 B1 | 6/2002 | Shah |
| 6,582,304 B2 | 6/2003 | Walker et al. |
| 6,824,464 B2 | 11/2004 | Weil et al. |
| 6,887,153 B2 | 5/2005 | Walker et al. |
| 6,899,621 B2 | 5/2005 | Behm et al. |
| 6,899,622 B2 | 5/2005 | Lind et al. |
| 7,263,411 B2 | 8/2007 | Shows |
| 7,740,243 B1 | 6/2010 | Kean |
| 7,756,742 B2 | 7/2010 | Gilmore et al. |
| 8,554,365 B2 | 10/2013 | Thomas |
| 9,251,663 B1 | 2/2016 | Sandvick |
| 9,339,121 B2 | 5/2016 | Siciliano et al. |
| 9,760,939 B2 | 9/2017 | Gleeson |
| 2001/0034263 A1 | 10/2001 | Roberts |
| 2001/0036855 A1 | 11/2001 | Defrees-Parrott et al. |
| 2002/0162850 A1 | 11/2002 | Yuyama |
| 2003/0114211 A1 | 6/2003 | White |
| 2003/0120381 A1 | 6/2003 | Perin, Jr. |
| 2003/0153381 A1 | 8/2003 | Slattery |
| 2003/0204288 A1* | 10/2003 | Scrymgeour ............ G07B 5/00 700/236 |
| 2003/0216164 A1 | 11/2003 | Scrymgeour |
| 2004/0023711 A1 | 2/2004 | Knapp |
| 2004/0176154 A1 | 9/2004 | Finnochio |
| 2004/0193464 A1 | 9/2004 | Szrek et al. |
| 2004/0227000 A1 | 11/2004 | Behm et al. |
| 2004/0242309 A1 | 12/2004 | Melesko et al. |
| 2005/0014552 A1 | 1/2005 | Packes et al. |
| 2005/0023346 A1 | 2/2005 | Bakker et al. |
| 2005/0059463 A1 | 3/2005 | Gilmore et al. |
| 2005/0190533 A1 | 9/2005 | Hultzman et al. |
| 2005/0233797 A1 | 10/2005 | Gilmore et al. |
| 2005/0250572 A1 | 11/2005 | Kane et al. |
| 2005/0280210 A1 | 12/2005 | Harrison |
| 2006/0012116 A1 | 1/2006 | Lovell, Sr. |
| 2006/0071046 A1 | 4/2006 | Roberts et al. |
| 2006/0246992 A1 | 11/2006 | Walker et al. |
| 2006/0273156 A1 | 12/2006 | Berm et al. |
| 2008/0208696 A1 | 8/2008 | Olson |
| 2009/0149239 A1* | 6/2009 | Youssef ................ G07F 17/32 463/17 |
| 2009/0163264 A1 | 6/2009 | Whiteman |
| 2010/0222125 A1* | 9/2010 | Nyman ................ G07F 17/32 463/17 |
| 2011/0087369 A1 | 4/2011 | Bauer |
| 2013/0260856 A1* | 10/2013 | Irwin, Jr. ............... G06Q 30/06 463/17 |
| 2014/0058280 A1 | 2/2014 | Chefles |
| 2014/0295945 A1* | 10/2014 | Nanni .................... G06Q 50/34 463/25 |
| 2015/0194008 A1 | 7/2015 | Kolios et al. |
| 2017/0018048 A1* | 1/2017 | Christensen ............ G07F 17/32 |
| 2017/0018148 A1* | 1/2017 | Behm .................... G07F 17/329 |
| 2017/0169652 A1 | 6/2017 | Kolesov |

FOREIGN PATENT DOCUMENTS

| | | |
|---|---|---|
| EP | 1 574 236 A1 | 9/2005 |
| WO | WO 99/26204 A1 | 5/1999 |
| WO | WO 03/043708 A2 | 5/2003 |
| WO | WO 2005/122732 A2 | 12/2005 |
| WO | WO 2006/074156 A2 | 7/2006 |
| WO | WO 2013/075214 A1 | 5/2013 |

* cited by examiner

METHOD AND SYSTEM FOR ENHANCED LOTTERY TICKET ACTIVATION AND SALE AT A RETAIL ESTABLISHMENT WITH SUBSEQUENT BILLING AND ACCOUNTABILITY OF SOLD TICKETS

PRIORITY CLAIM

The present application is a Continuation Application of U.S. application Ser. No. 15/188,469, filed Jun. 21, 2016.

BACKGROUND

Instant lottery tickets are sold at many types of retail locations including, stores, such as grocery stores, general merchandise stores, and the like. Many such stores feature one or more check-out points or lanes equipped with a point-of-sale (POS) register. The lottery tickets, however, are typically sold at a separate lottery point-of-sale terminal within the same retail establishment. This system generally requires additional personnel to staff the lottery ticket POS terminal, or requires the store clerk to divide their time and responsibility between the lottery POS terminal and the store POS terminal. The conventional system and method also require a separate accountability and tracking system for lottery ticket sales, which can add significantly to the cost and burden of providing the lottery to players at the retail establishment.

In addition, because of the current methods by which the tickets are packaged and accounted for, an entire pack (also referred to as a "brick") of tickets is generally activated upon delivery to the retail establishment. This may result in a billing event to the retailer wherein payment becomes due on the entire pack before any significant number of the tickets have actually been sold, which can be a financial burden on the retailer.

Another problematic situation arises with certain current accountability systems and methods wherein the number of lottery tickets sold during a work shift or other defined time period must be accounted for and reconciled with payments received at the POS register or lottery terminal. Often, this is done by hand by store clerks who record start and end serial numbers of the tickets sold during their shift, which can be prone to human error, particularly in a busy or hectic environment. Systems have been proposed that automatically record the serial numbers and calculate the number of tickets sold, but even these systems do not conduct a balance reconciliation with the POS register.

The present invention relates to a unique system and method that addresses at least certain of the issues identified above, and may provide additional benefits over the conventional methodology and systems for activation, sale, and subsequent accountability of lottery tickets.

SUMMARY

Objects and advantages of the invention will be set forth in part in the following description, or may be obvious from the description, or may be learned through practice of the invention.

In accordance with aspects of the invention, a method is provided for activating and dispensing instant or other preprinted lottery tickets at a retail establishment. The type of retail establishment may vary widely within the scope and spirit of the invention. For example, in certain embodiments, the retail establishments may be convenience stores, gas stations, pubs, and any other establishment that typically sells lottery tickets to the public. The present system has particular usefulness for much larger retail establishments, such as "big-box" retail stores that are part of a national or other geographic chain, wherein the sale of lottery ticket sales has generally not been implemented.

In accordance with an embodiment of the present method, for each pack of lottery tickets delivered to the retail establishment, a pack code unique to the ticket pack is scanned and transmitted to the central lottery server. At the central lottery server, the method includes electronically activating the lottery tickets within the ticket pack associated with the respective pack code and flagging the lottery tickets with a "ready for sale" status in a database. At the retail establishment, the method includes scanning a unique ticket code provided on each lottery ticket at a time of sale of the individual lottery ticket and transmitting the ticket code to the central lottery server. At the central lottery server, upon receipt of the ticket code, the method includes confirming that the ticket code is associated with a lottery ticket previously flagged as ready for sale and, if so, individually flagging the lottery ticket status as sold in the same or a different database. At defined time intervals, the method provides accountability and billing information from the central lottery server to a central retail establishment server based on individual lottery tickets flagged as activated and sold during the defined time periods. For example, for billing purposes, individual ticket transactions can be instantaneously posted or otherwise accounted for at the time of sale of the ticket, with a billing reconciliation being conducted at set intervals, such as nightly, and so forth. For each sale of a ticket at the retail establishment, the lottery provided can be credited with a portion of the sales price in an ongoing account, wherein this account is reconciled with the retail establishment at the defined interval for the tickets sold during such interval.

The method may further comprise redeeming only lottery tickets having a sold status in the data base.

In certain embodiments, the lottery ticket codes within a ticket pack are sequentially numbered, and the method further includes detecting gaps in the lottery ticket codes flagged as sold from a ticket pack with the central lottery sever and reporting the detected gaps to the central retail establishment server for further investigation/reconciliation.

In certain embodiments, the pack codes may be unique codes assigned to each pack separate from the ticket codes. For example, this pack code may be provided on or within the packaging of each ticket pack. In alternate embodiments, the pack code may be the ticket code assigned to the very first ticket in the pack. In other words, the first ticket code serves the dual function of a pack code and a unique ticket identifying code.

For the lottery ticket packs delivered to the retail establishment, the method may include scanning the pack codes with a terminal scanner configured with a lottery terminal at the retail establishment. For embodiments wherein the pack code is also the first ticket code, the pack code may be scanned by an individual bin scanner upon initial loading of the ticket pack into the dispensing bin. Subsequently, the lottery ticket packs can be individually loaded into individual respective bins of a lottery ticket dispenser arranged at the retail establishment, wherein the method includes scanning the lottery ticket codes with the respective scanner configured with each bin upon sale and removal of the lottery tickets from the bins.

In certain embodiments, a retail point-of-sale (POS) register is in communication with the lottery ticket terminal at the retail establishment, wherein the method includes accepting a request for purchase of a lottery ticket at the lottery ticket terminal and transmitting a purchase code for the lottery ticket from the lottery terminal to the POS register. A purchase signal is then transmitted to the bin in the array containing the requested lottery ticket for dispensing the lottery ticket. This purchase signal may originate from the lottery ticket terminal or from the POS register.

A plurality of the retail establishments may be in communication with the central retail establishment server and the central lottery server, wherein the method may include providing accountability and billing information to the central retail server from the central lottery server for each of the retail locations based on lottery tickets flagged as activated and sold at the respective retail establishments during the defined time periods.

It should be appreciated that the present method may be implemented by various system configurations. For example, such a system may include one or a plurality of retail point-of-sale (POS) registers wherein patrons of the establishment purchase goods. A lottery ticket terminal may be configured in communication with the retail POS register to accept a request for purchase of a particular lottery ticket selected from a plurality of different lottery tickets. For example, a patron's request for a particular scratch-off lottery ticket is inputted to the lottery ticket terminal by a retail clerk or other employee of the establishment. A lottery ticket dispenser array may be in communication with the lottery ticket terminal and includes one or a plurality of separate dispensing bins having a different respective lottery ticket stored therein. For example, the dispenser array may include ten separate bins, with each bin containing a supply of different scratch-off lottery ticket games, or two or more bins may contain a respective supply of tickets for the same game. Regardless, each lottery ticket contained in the bins includes a unique machine readable code printed thereon, such as a bar code, QR code, or the like. Each bin in the array includes an electronic drive mechanism that, when activated, dispenses one or more lottery tickets from the bin (depending on the number of tickets requested by the patron). Each bin also includes a scanner disposed to read the code on lottery tickets dispensed from the bin position.

In operation of the exemplary system discussed above, the lottery ticket terminal transmits a purchase signal for dispensing a particular lottery ticket that is routed to the respective bin containing the lottery ticket, which activates the drive mechanism to dispense the requisite number of tickets from the bin. As the tickets are dispensed from the bin, the scanner may read the code printed on each ticket, which eventually results in a signal being routed to a central lottery server for each lottery ticket dispensed from the dispenser array. The code printed on each ticket contains identifying information unique to the ticket, and the signal transmitted to the central server enables actions relevant to the sale of the tickets, such as changing a status of the individual ticket in the lottery provider's system, accounting for tickets sold at a particular retail establishment, reconciling tickets sold at a retail establishment with tickets delivered to the establishment, and so forth. For sequentially dispensed tickets, for example five tickets in a single purchase transaction, the system may be configured to read or otherwise recognize the codes on the first and last ticket if the codes are printed in sequential order on the tickets. By knowing the first and last codes, the intervening codes are readily determined.

For embodiments wherein the retail establishments are part of a chain and are operated under the direction of a central office or organization, the central lottery server may be in communication with a central retail server that is common to such establishments, wherein the lottery sever provides accountability and billing information to the central retail server based on lottery tickets dispensed and sold during defined time periods. For example, the lottery server may provide to the central retail server a detailed accounting of the number of tickets sold at each individual retail establishment over a defined time period. The lottery server may also provide accountability information related to the number of tickets sold versus the number of tickets delivered to each respective establishment, including particularly identifying discrepancies between the number of tickets delivered and the number of tickets sold, as well as reporting any gaps in ticket codes sold from an activated ticket pack.

In addition, a retail establishment may include a back office server in communication with the retail POS register, wherein the central lottery server provides accountability and billing information to the individual back office servers based on lottery tickets dispensed at the respective retail establishments during defined time periods.

A plurality of the retail establishments may be in communication with the central retail server and the central lottery server, with each of the retail establishments including a retail POS register, lottery ticket terminal, and dispensing bin configured as discussed above. In this configuration, the central lottery server provides accountability and billing information to the central retail server for each of the retail locations based on lottery tickets dispensed at the respective retail locations during defined time periods.

The system may, in certain embodiments, be configured such that the lottery ticket terminal transmits a purchase code for the lottery ticket to the retail POS register. In this manner, the patron pays for the lottery tickets at the POS register along with other goods purchased at the establishment.

A system for implementing the present methods may be configured with a bin controller that controls the various functions of the dispenser array, including receiving and routing the purchase signals from the lottery ticket terminal to the correct bins, and communicating with the central lottery server and/or the retail establishment back officer server.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
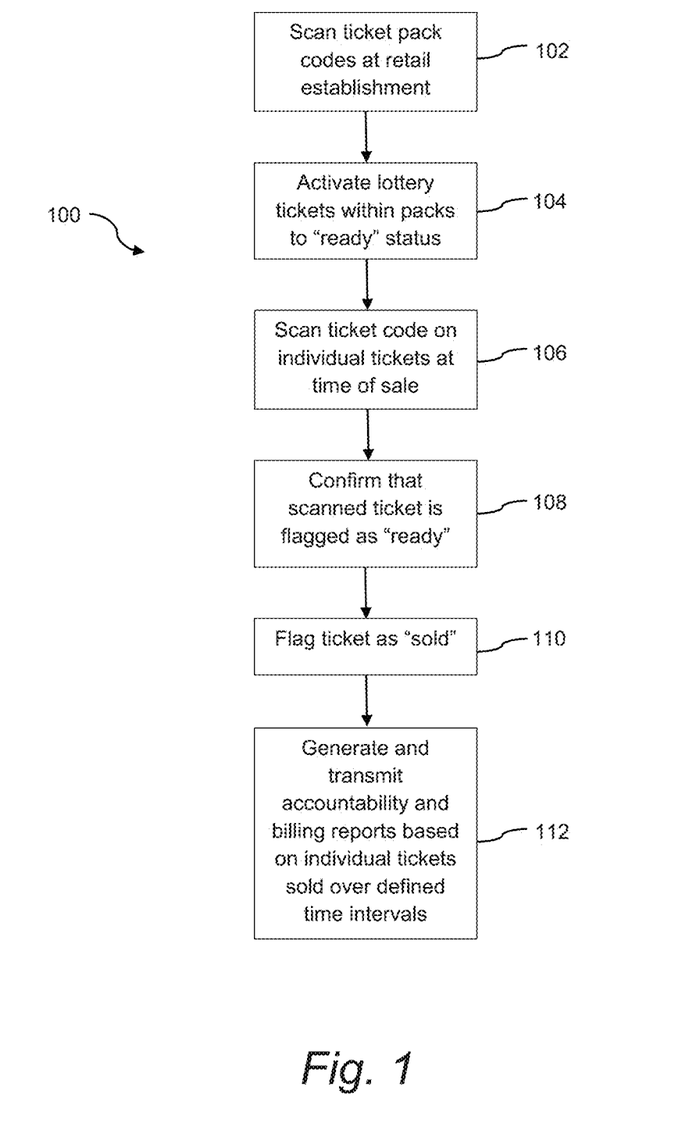
FIG. 1 is a flow diagram of an embodiment of a method in accordance with aspects of the present invention.

FIG. 1 is a block flow diagram illustrating concepts of the various methods 100 in accordance with aspects of the invention. Individual ticket packs of instant lottery tickets from a lottery provider are delivered to various retail establishments for sale. At step 102, for each pack of lottery tickets delivered to a retail establishment, a pack code unique to the ticket pack is scanned and transmitted to the central lottery server.

At the central lottery server, the method includes at step 104 electronically activating the lottery tickets within the ticket pack associated with the respective pack code and flagging the lottery tickets with a "ready for sale" status (which includes any similar functional indicator) in a database.

At the retail establishment, the method includes at step 106 scanning a unique ticket code provided on each lottery ticket at a time of sale of the individual lottery ticket and transmitting the ticket code to the central lottery server.

At the central lottery server, at step 108, upon receipt of the ticket code, the method includes confirming that the received ticket code is associated with a lottery ticket previously flagged as ready for sale. If so, at step 110, the method individually flags the lottery ticket status as sold (or similar functional status) in the same or a different database.

At step 112, at defined time intervals, the method provides accountability and billing information from the central lottery server to a central retail establishment server based on individual lottery tickets flagged as activated and sold during the defined time periods. For example, for billing purposes, individual ticket transactions can be instantaneously posted or otherwise accounted for at the time of sale of the ticket, including crediting the lottery provide with a portion of the sales price of each ticket at the time of sale of the tickets. At defined time intervals, such as nightly, and so forth, a billing reconciliation can be conducted between the retail establishment(s) and the lottery provider. For example, for each sale of a ticket at the retail establishment, the lottery provider can be credited with a portion of the sales price in an ongoing account, wherein this account is reconciled with the retail establishment at the defined interval for the tickets sold during such interval.

Additional aspects of various method embodiments 100 are described with reference to FIGS. 2 through 8 below.

Figure 2:
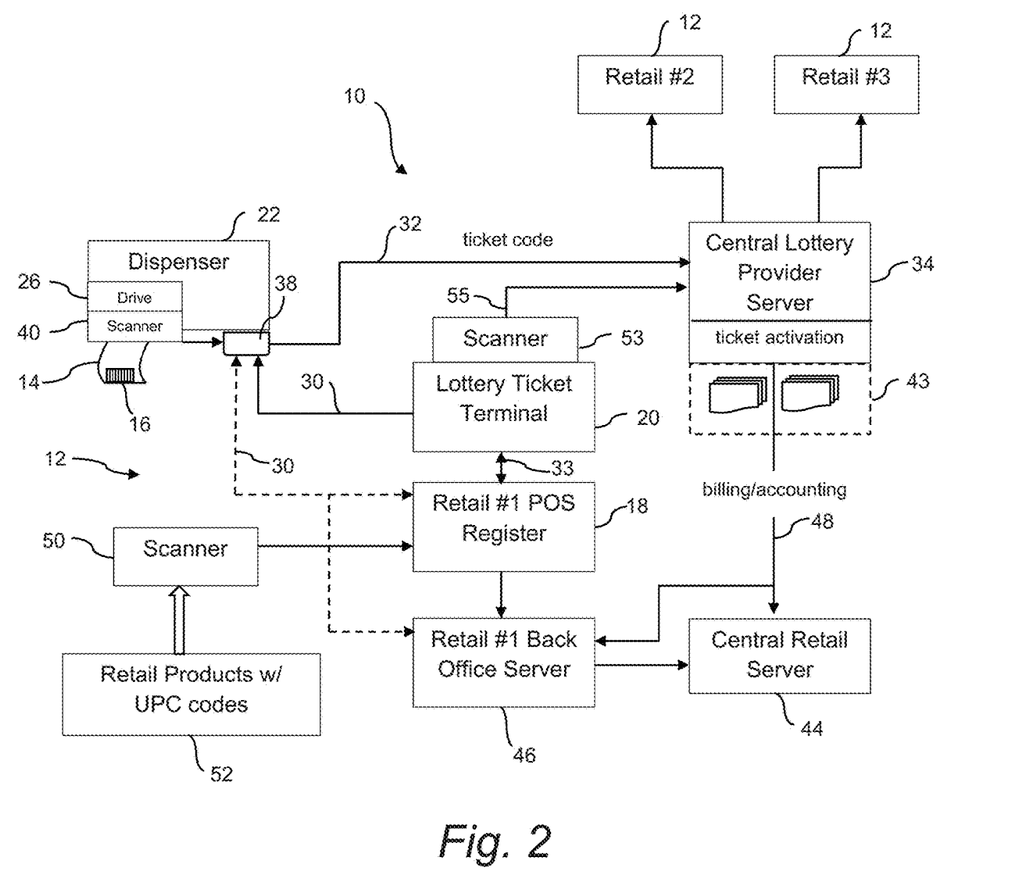
FIG. 2 is a block diagram of a system and associated methodology steps in accordance with aspects of the present invention.

FIG. 2 depicts an embodiment of a system 10 and related methodology for dispensing lottery tickets 14 at a retail establishment 12. As mentioned above, the type of retail establishment 12 may vary widely within the scope and spirit of the invention. A retail establishment or location 12, such as a retail store, convenience store, pub, restaurant, or the like, is generally authorized by a lottery authority (e.g. a state lottery authority such as the Connecticut State Lottery or any other governmental jurisdictional authority) to carry out lottery activities administered by a lottery provider, such as the sale of instant scratch-off tickets or terminal printed draw tickets for games such as Powerball™. A separate game/lottery provider may be partnered with the lottery authority to provide certain control, implementation, and logistical functions of the game. It should be appreciated that the type of retail establishment 12, lottery authority, or lottery provider entities are not limiting factors of the invention.

Although not limited to such, the present system 10 has particular usefulness for larger retail establishments, such as "big-box" retail stores that are part of a national or other geographic chain. In FIG. 2, three separate retail establishments 12 are depicted, with details given for one the establishments. This is for illustrative purposes only. It should be appreciated that the invention encompasses a single retail establishment 12, as well as a multitude of establishments 12, as discussed in greater detail below.

The retail establishment 12 typically includes one or more retail point-of-sale (POS) registers 18 wherein patrons of the establishment 12 purchase goods 52. Typically, a scanner 50 is associated with the POS register 18 to scan a UPC code on the products 52, with the UPC code linked to a purchase price and identification of the products 52, as is well-known in the art.

In the embodiment of FIG. 2, a lottery ticket terminal 20 is configured in wired or wireless communication with the retail POS register 18 to accept a request for purchase of a particular lottery ticket 14 selected from a plurality of different lottery tickets made available to patrons for purchase. This request may be input directly to the terminal 20 or come via the POS register 18, as discussed in greater below. The lottery tickets 14 may be, for example, conventional instant scratch-off lottery tickets. Various types of lottery ticket terminals are known in the art and suitable for configuration with a system 10 in accordance with the invention. For example, Scientific Games Corporation having a principal place of business in Alpharetta, Ga., USA, offers Flair™ and Wave™ lottery ticket terminals that may be readily configured by those skilled in the art for a system as described herein. A patron's request for a particular scratch-off lottery ticket may be inputted into the lottery ticket terminal 20 by a retail clerk or other employee of the retail establishment 12 by various means. For example, the terminal 20 may be configured with a scanner, wherein the clerk scans a "master" having a code corresponding to the particular lottery ticket 14 requested by the patron. Thus, a master would be provided for each type of lottery ticket 14 offered by the establishment 12. In another embodiment, the terminal 20 may be configured with a touch-screen, keyboard, or other data input device, wherein the clerk enters or identifies the ticket 14 requested by the patron.

Still referring to the embodiment of FIG. 2, a "smart" lottery ticket dispenser array 22 is in wired or wireless communication with the terminal 20. This dispenser array includes one or a plurality of individual lottery ticket bins 24 (FIGS. 3 and 4), with each bin 24 typically containing a different respective lottery ticket game. For example, one bin 24 may contain "Lucky 7" themed scratch-off lottery tickets 14, while an adjacent bin 24 may contain "Gold Rush" themed scratch-off lottery tickets 14, and so forth.

Each lottery ticket 14 in the different bins includes a unique machine readable code 16 printed thereon, such as a bar code, QR code, or the like. The type of code 16 may vary depending on the desired information content of the code 14, space on the ticket 14, and so forth. The use of such codes 16 on lottery tickets 14 for various functions related to inventory, identification, verification, and security are well-known.

Figure 7:
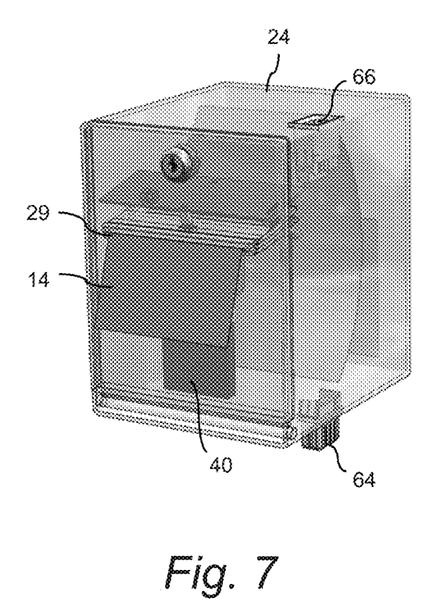
FIG. 7 is a back perspective view of an individual bin of the lottery ticket dispenser of FIG. 5.
Figure 8:
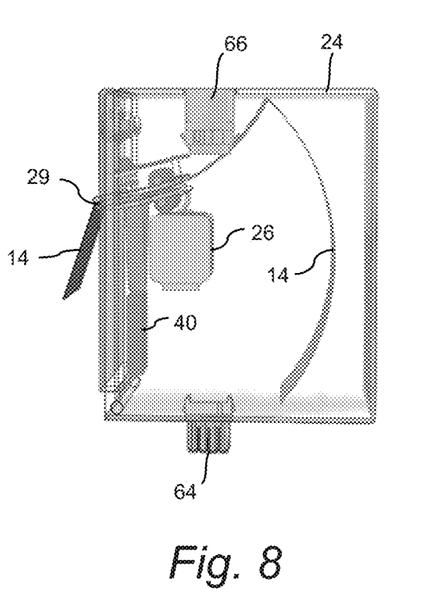
FIG. 8 is a side view of the individual bin of the lottery ticket dispenser of FIG. 5.

Referring to FIGS. 7 and 8, each bin 24 in the dispenser array 22 includes an electronic drive mechanism 26 that, when activated, dispenses one or more lottery tickets 14 from the bin 24 (depending on the number of tickets requested by the patron). This drive mechanism 26 may include a motor that drives a friction roll, wherein the tickets 14 are engaged between the friction roll and an idler roll such that driven rotation of the friction roll causes the tickets 14 to be advanced through a dispensing slot 29 in a wall of the individual bin 24. The drive mechanism 26 may also include a sensor that detects a leading and/or trailing edge of adjacent tickets so as to control the length or the time of the dispense sequence. For example, such a sensor may detect a perforation line between adjacent tickets. Alternately, the friction or idler roll may include an encoder that indirectly measures the length of a ticket passing between the rolls as a function or rotations of the roll. In another embodiment, a timing circuit may control the dispense cycle as a function of run time of the motor. It should be appreciated that the drive mechanism may be variously configured to perform the functions of dispensing the requisite number of tickets 14 from the individual respective bin 24 within the scope and spirit of the invention.

In the illustrated embodiments, each bin 24 also includes a scanner 40 disposed so as to read the code 16 on the lottery tickets 14 as they are dispensed from the bin 24. The scanner 40 may be any conventional barcode reader, such as a point scanner, linear scanner, laser scanner, LED image scanner, and so forth. The tickets 14 are loaded into the bins 24 such that the code 16 printed on each ticket passes within the detection field of the scanner 40. An integral (or separate) reader is configured with the scanner 40 to decode the scanner signal.

Figure 3:
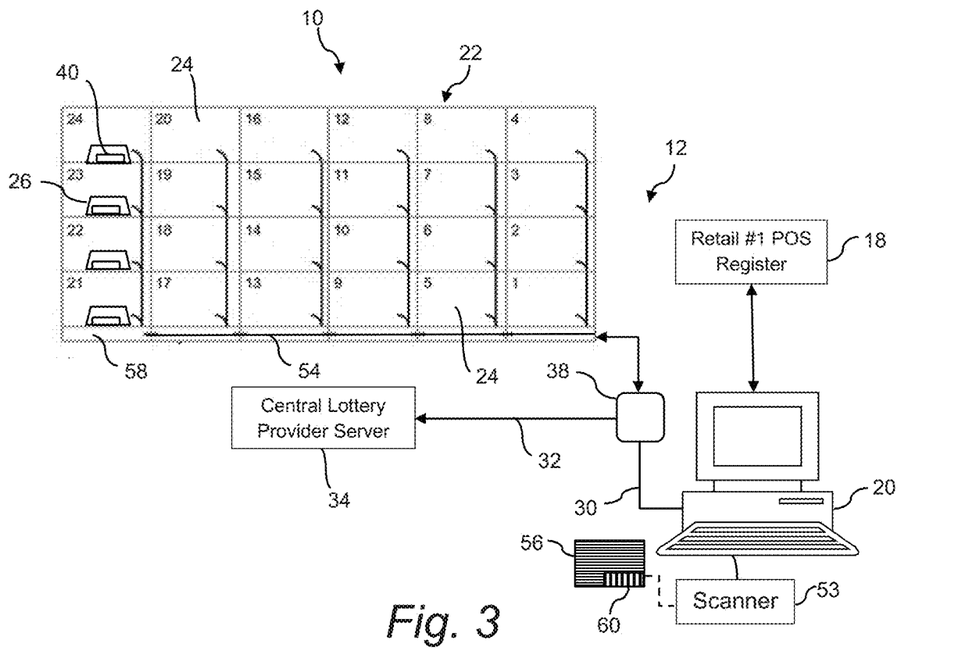
FIG. 3 is a block diagram of a lottery ticket dispenser that may be used in practice of the present method.

Referring to FIGS. 2 and 3, as discussed above, individual ticket packs 56 are delivered to the retail establishment. A scanner is associated with each array 22 (or bin 24) to read a pack code 60 associated with the pack 56 of lottery tickets upon loading of the pack 56 of lottery tickets into the array 22. Referring to FIG. 3, this code may be, for example, a single code 60 provided with the packaging of the ticket pack. With this embodiment, the scanner 50 provided at or near the lottery terminal 20 may be used to scan the ticket pack code 60 and transmit the code 60 directly to the lottery central server 34 or through the bin controller 38. In an alternate embodiment, the pack code may be the ticket code 16 on the lead ticket 14 in the pack 56, which can be scanned by the terminal scanner 50 or the individual bin scanners 40 associated with each bin 24 and transmitted to the lottery central server 34 via the bin controller 38. For purposes of the present invention, it is not absolutely necessary that the individual bin 24 in which new ticket packs 56 are loaded be identified, but only the bin array 22. Thus, it many embodiments, the terminal-scanner 50 (which is not associated with any particular bin 24 within the array 24) will suffice for the function initially activating the tickets 14 within a ticket pact 56 to the "ready for sale" status discussed above.

In operation of the system 10 depicted in FIG. 2, the lottery ticket terminal 20 transmits a purchase signal 30 for dispensing a particular lottery ticket 14 that is routed to the respective bin 24 within the dispenser array 22 containing the requested lottery ticket. This purchase signal 30 may be sent to a bin controller 38 associated with the dispenser array 22, with the controller 38 generating a dispense signal that is routed to the proper bin 24 to activate the drive mechanism 26 and dispense the requisite number of lottery tickets 14 from the bin 24. In essence, the bin controller 38 functions as a signal router for the array 22 that ensures that the signal 30 is routed to the correct bin 24.

FIG. 2 also depicts an alternate embodiment wherein the purchase signal 30 is generated by the POS register 18 and transmitted to the bin controller 38 after the POS register 18 receives a purchase code 33 from the lottery ticket terminal 20 corresponding to the particular ticket requested by the patron.

As the tickets 14 are dispensed from the bin 24, the scanner 40 reads the code 16 printed on each ticket. A signal 32 corresponding to the scanned code is generated and routed to a central lottery server 34 for each lottery ticket dispensed from the dispenser array 22. In the embodiment of FIG. 1, this signal 32 is generated and transmitted by a controller configured with the lottery ticket terminal 20, which is in wired or wireless communication with the central lottery server 34.

The controller may be an integral component of the terminal 20 (or integrated with the terminal's other functionalities), or an add-on component that is configured in communication with the lottery terminal 20. As mentioned, the code 16 printed on each ticket contains identifying information unique to the ticket, much akin to a serial number assigned to each ticket, and the signal 32 transmitted to the central server 34 enables actions relevant to the sale/dispensing of the individual tickets 14 in accordance with aspects of the invention.

The central lottery server 34 may include a database 43 of all tickets delivered to the respective retail establishments 12, and the near instantaneous identification of dispensed/sold lottery tickets 14 to the server 34 enables various desired functionalities. For example, the individual lottery tickets 14 may remain in a "ready for sale" status upon activation of the ticket packs 56, as discussed above, and only upon generation of a purchase signal 30 and the scanned ticket signal 32 transmitted to the central server 34 is the status of the individual tickets changed in the database 43 to "sold" (or similar functional status). The present method may include limiting subsequent redemption of the lottery tickets 14 to only tickets that have this "sold" status in the database 43. Thus, fraudulently obtained tickets (e.g., stolen or otherwise illegally obtained) cannot be redeemed. This is contrary to a conventional practice of activating entire books ("packs") of tickets upon delivery to a retail establishment 12.

The present system 10 and associated method allows for enhanced accountability and crediting of lottery tickets 14 sold at a particular retail establishment 12 by logging each ticket as it is sold and dispensed. For example, the number of tickets 14 sold during a work shift (or other time period) is easily determined by generating a report by the central server 34 of the tickets flagged as sold at any of the retail establishments during any defined time period. The number of tickets 14 sold at any of the retail establishments 12 can be readily reconciled with tickets (e.g., ticket packs) delivered to the establishment. Likewise, the number of tickets 14 dispensed during a defined time can be readily and electronically reconciled with reported purchase transactions from the respective establishment 12, with discrepancies being immediately identified for further investigation.

Another particular advantage of the system 10 and associated method is that billing practices between the retail establishments 12, the lottery authority, and the lottery provider can be based on real-time sales of the lottery tickets 14. For example, the retail establishments 12 can be invoiced on a periodic basis (e.g., daily or weekly) for the actual number of tickets sold (dispensed) at each respective establishment based on the signals 32 routed to the central lottery server 34 instead of upon delivery and activation of ticket packs (or other payment methodology typically in use today).

Another useful function enabled by the present system 10 and associated methods is detection of "gaps" in the sequential numbering of the lottery tickets 14 flagged as sold with the central server 34 from a respective ticket pack 56. Such gaps indicate an improper disposal or possible theft of the missing tickets 14, which the central server 34 can immediately report to the central retail establishment server for further investigation/reconciliation.

FIG. 2 depicts the central lottery server 34 that is common to the retail establishments 12. The term "server" is used herein to encompass any configuration of computer hardware and software that is maintained by a lottery authority or game provider to carry out the functionalities of the present system 10 and associated method, as well as any manner of additional lottery functions known to those skilled in the art. It should be readily appreciated that the server 34 may include an integrated server, or any manner of periphery server or other hardware structure. The central lottery server 34 is typically remote from the retail establishments 12, and is in communication with the establishments 12 via a suitable secure communication network, which may include any manner of wide area network, wireless internet, or cloud computing. The server 34 may be a single networked computer, or a series of interconnected computers having access to the communications network via a gateway or other known networking system. Generally, the server 34 is configured to communicate with, manage, execute and control individual lottery terminal units 20 within the lottery jurisdiction. The server 34 may be a "front end" server provided by the lottery game provider that is interfaced with the existing draw/instant game system infrastructure one or more separate lottery authorities. The server 34 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The server 34 may be directly or indirectly connected through an I/O bus to any manner of peripheral devices such as storage devices, wireless adaptors, printers, and the like. In addition, a database (DB) may be communicatively connected to the server 34 and provide a data repository for the storage and correlation of information gathered from the individual dispenser arrays 22, such as the identity of each lottery ticket 14 dispensed from the array, the time of the dispense sequence, confirmation of ticket activation, and so forth.

It should be appreciated that embodiments of the methods and systems 10 disclosed herein may be executed by one or more suitable networked lottery gaming components and establishment components (e.g., POS register 18, back office server 46) within a plurality of the establishments 12, as well as the remote central server 34. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present system 10 and methods rely on the transmission of data over one or more communications networks. It should be appreciated that network communications can comprise sending and/or receiving information over one or more networks of various forms. For example, a network can comprise a dial-in, public switched telephone network (PSTN), a local area network (LAN), wide area network (WAN), the Internet, an intranet or other type of network. A network may comprise any number and/or combination of hard-wired, wireless, or other communication links.

Referring again to FIG. 2, for embodiments wherein the retail establishments 12 are part of a chain and are operated under the direction of a central office or organization, the central lottery server 34 may be in communication with a central retail server 44 (e.g., a "home office") that is common to such establishments 12. The central lottery server 34 may provide ticket accountability and billing information 48 based on real-time sales of the lottery tickets 14 at scheduled times to the central retail server 44 based on lottery tickets 14 dispensed during defined time periods. The dispensed tickets may have also been activated during the same time period and, as used herein "dispensed" includes tickets that are also activated by the central lottery server 34. For example, the central lottery server 34 may provide to the central retail server 44 a detailed accounting of the number of tickets sold at each individual retail establishment 12 during a defined time period. The lottery server 34 may also provide accountability information related to the number of tickets 14 dispensed versus the number of tickets delivered to each respective establishment, including particularly identifying discrepancies between the number of tickets delivered and the number of tickets dispensed. At its end, the central retail server 44 can compare the number of tickets 14 reported as dispensed to the sales transactions at the respective establishment 12 (reported via a back office server 46 associated with each establishment 12 or directly from the POS registers 18) over the same time period Each retail establishment 12 may include a respective back office server 46 in communication with the retail POS register 18, wherein the central lottery server 34 may also provide accountability and billing information directly to the individual back office servers 46 (as indicated in FIG. 2) based on lottery tickets 14 dispensed at the respective retail establishment 12 during defined time periods.

As mentioned above, the system 10 may be configured with a bin controller 38 that is integrated with the dispenser array 22 or remote from the array 22. This bin controller 38 controls the various functions of the dispenser array 22, including receiving and routing the purchase signals 30 from the lottery ticket terminal 20 or POS register 18 to the correct bins 24, and communicating with the central lottery server 34 and/or the retail establishment back officer server 46 directly or via the central lottery server 34.

FIGS. 3 through 8 depict various aspects and functionalities of embodiments of the dispenser array 22 and individual bins 24. In FIG. 3, the system 10 at a retail establishment 12 includes the lottery ticket terminal 20 in communication with the POS register 18 and the bin controller 38, which is in communication with the lottery ticket dispenser array 22. The dispenser array 22 has a plurality of individual bins 24 with different respective lottery tickets contained therein. The lottery tickets each have a machine readable ticket code printed thereon, as discussed above. Each bin 24 in the dispenser array 22 includes an electronic drive mechanism 26 that dispenses the lottery tickets therefrom, and a scanner 40 disposed to read the ticket code on the lottery tickets dispensed from the bin 24. The central lottery server 34 is in direct or indirect (e.g., via the bin controller 38) communication with each bin 24 such that the signal 32 generated by the scanner 40 at any one of the bins 24 is routed to the central lottery server 34 for each ticket dispensed from the bins 24, the signals 32 identifying the lottery ticket from the scanned code. This system 10 may, in addition, include any of the features and configurations discussed above.

Figure 4:
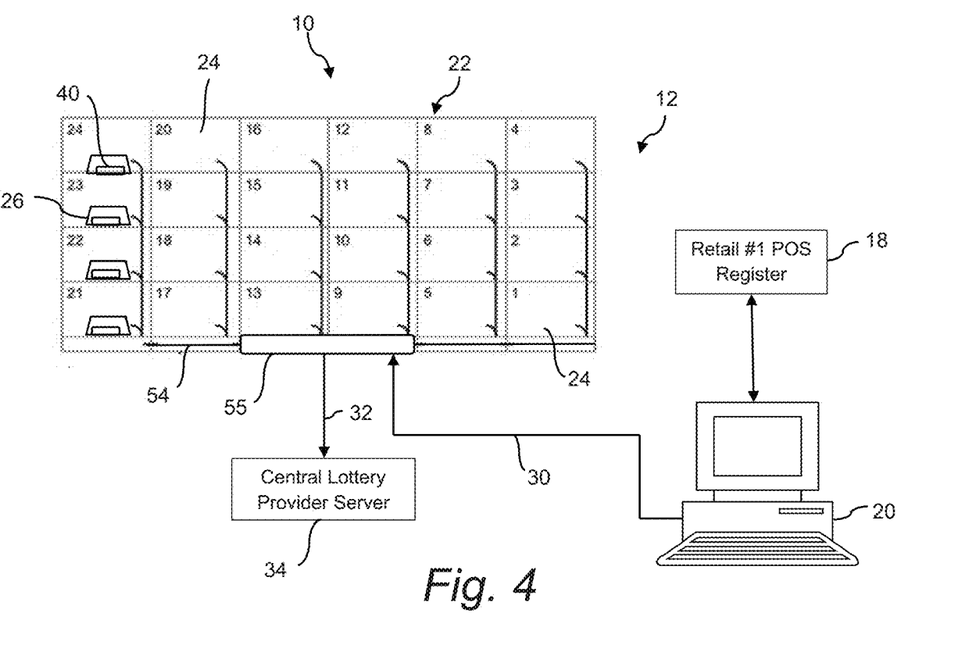
FIG. 4 is a block diagram of another embodiment of an exemplary lottery ticket dispenser.

FIG. 4 depicts an embodiment that is similar to FIG. 2 with the exception that the dispenser array 22 (and thus the individual bins 24) are in direct communication with the central lottery server 34 via a signal router 55 integrated with the dispenser array 22. This router 55 routes the purchase signal 30 from the lottery ticket terminal 20 to the correct bin 24, and routes the bin signal 32 directly to the server 34 via a suitable wired or wireless communication network.

Figure 5:
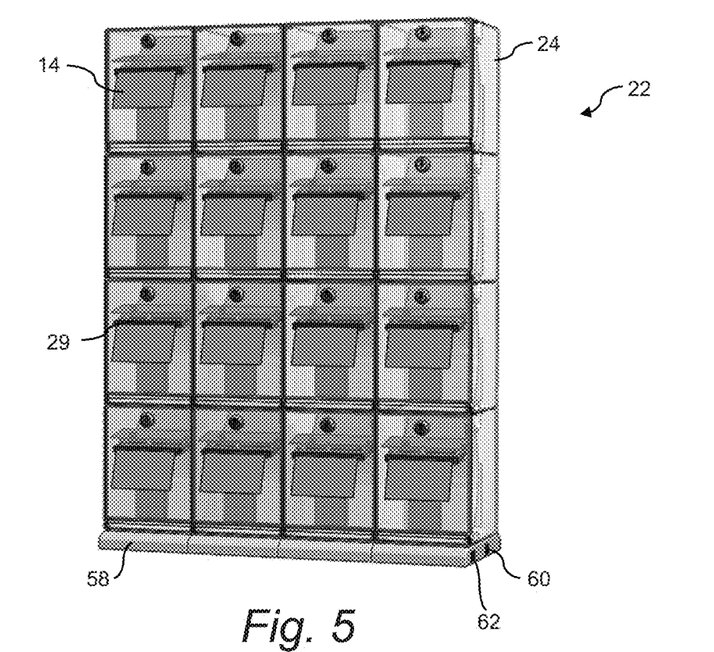
FIG. 5 is a back perspective view of an embodiment of a lottery ticket dispenser.
Figure 6:
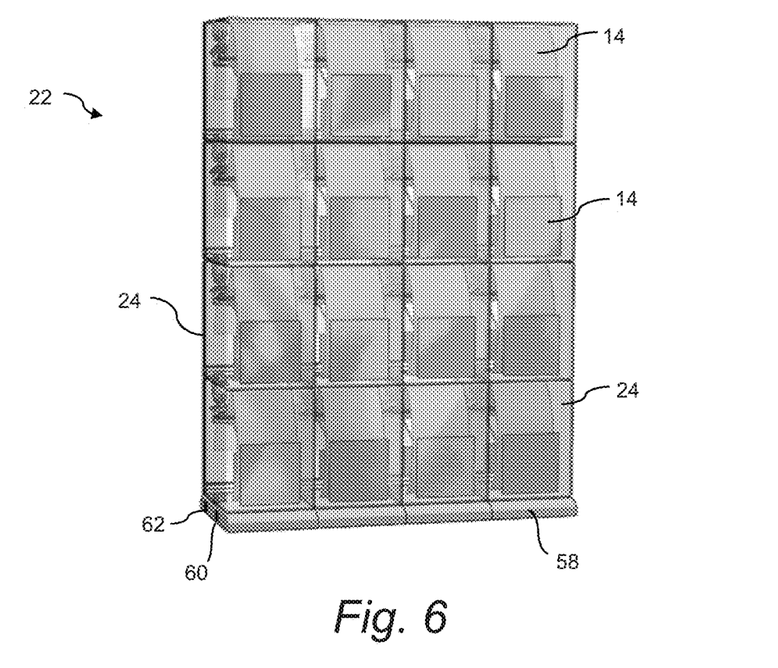
FIG. 6 is a front perspective view of the lottery ticket dispenser of FIG. 5.

FIGS. 5 through 8 depict a particular embodiment of a dispenser array 22 having a plurality of interconnected individual bins 24. The array 22 includes a bottom row of bins 24 having interconnected base structures 58. For example, each base structure 58 may include a male power plug and male data plug along one side, and a female power port 60 and female data port 62 along the opposite side. The plugs and ports of adjacent base structures 58 interconnect, as depicted in FIGS. 5 and 6, to essentially define a data bus 54 (FIGS. 3 and 4) running the length of the base structures 58. An exposed power port 60 and data port 62 at one of the ends of the interconnected base structures is available for connection with a power cord and a data cord from the controller 38 or lottery terminal 20, as discussed above.

Referring to FIGS. 7 and 8, each of the upper individual bins 24 includes a multi-sided housing in which a pack of lottery tickets 14 is stored. As shown in FIG. 5, each bin 24 may include a sample ticket 14 or other identifying insert attached to a front face of the bin 24 that faces the patrons so that the patron is aware of the exact tickets available for purchase. The tickets 14 may be connected at a perforation line, or separated. A drive mechanism 26 and scanner 40 are configured within each bin 24, as discussed above, wherein upon receipt of a purchase signal, the drive mechanism dispenses the requisite number of tickets 14 out of a slot 29 in the back face of the bin 24 as the scanner 40 reads the code printed on the ticket as it passes through the slot 29. Each bin 24 includes a male power/data connector 64 on the top or bottom surface, and a corresponding female power/data connector 66 on the opposite surface. With this configuration, a plurality of the bins 24 can be vertically stacked and interconnected as depicted in FIGS. 4 and 5.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A system for activating and dispensing lottery tickets at a retail establishment, comprising:

a plurality of packs of lottery tickets, each pack of lottery tickets comprising a unique pack code and each lottery ticket comprising a machine readable unique ticket code thereon;

a central lottery server remote from the retail establishment and configured to electronically activate the lottery tickets within each of the packs of lottery tickets to a ready for sale status in a database upon receipt of the unique pack codes transmitted from the retail establishment to the central lottery server;

a lottery ticket dispenser at the retail establishment comprising a plurality of individual bins, wherein each of the packs of lottery tickets is loaded into a respective individual bin;

each of the individual bins comprising an electronic drive mechanism and a bin scanner disposed to read the unique ticket code as the lottery ticket is dispensed out from the individual bin and transmit the unique ticket code the central lottery server;

the central lottery server further configured to confirm that the unique ticket code received from the bin scanner is associated one of the lottery tickets previously flagged as ready for sale and to then flag the lottery ticket as sold in the database;

a common lottery ticket terminal at the retail establishment, each of the individual bins in communication with the common lottery ticket terminal, the lottery ticket terminal configured to accept a request for purchase of a particular lottery ticket selected by a purchaser from one of the individual bins and transmit a purchase code for the particular lottery ticket to a point of sale (POS) register at the retail establishment such that the purchaser is able to purchase the particular lottery ticket along with other goods from the retail establishment in a common transaction at the POS register;

one or both of the POS register and the lottery terminal configured to transmit a purchase signal to the individual bin containing the particular lottery ticket; and the central lottery server further configured to, at defined time intervals, provide accountability and billing information from the central lottery server to a central retail establishment server based on the lottery tickets flagged as activated and sold during the defined time periods.

2. The system as in claim 1, wherein the unique pack code is a code associated with the pack of lottery tickets separate from the unique ticket code for any lottery ticket within the pack of lottery tickets.

3. The system as in claim 1, wherein the unique pack code is also the unique ticket code assigned to a first one of the lottery tickets within the pack of lottery tickets.

4. The system as in claim 1, wherein the unique ticket codes within each of the packs of lottery tickets are sequentially numbered, the central lottery server further configured to detect a gap in the unique ticket codes flagged as sold from one of the packs of lottery tickets and report the gap to the central retail establishment server.

5. The system as in claim 1, wherein the lottery ticket terminal comprises a scanner configured to scan the unique pack code for each of the packs lottery tickets delivered to the retail establishment and transmit the unique pack codes to the central lottery server.

6. The system as in claim 1, wherein a plurality of the retail establishments are in communication with the central retail establishment server and the central lottery server, wherein the central lottery server is further configured to provide the accountability and billing information to the central retail server for each of the retail establishments based on the lottery tickets flagged as activated and sold at each of the retail establishments during the defined time periods.

\* \* \* \* \*